US007026846B1

(12) United States Patent
Huntley, Jr. et al.

(10) Patent No.: US 7,026,846 B1
(45) Date of Patent: Apr. 11, 2006

(54) SYNTHESIZER STRUCTURES AND METHODS THAT REDUCE SPURIOUS SIGNALS

(75) Inventors: Roger B. Huntley, Jr., Colfax, NC (US); Jon T. Baird, High Point, NC (US); David T. Crook, Summerfield, NC (US); Ken Gentile, Bahama, NC (US); Reuben P. Nelson, Greensboro, NC (US)

(73) Assignee: Analog Devices, Inc., Norwood, MA (US)

( * ) Notice: Subject to any disclaimer, the term of this patent is extended or adjusted under 35 U.S.C. 154(b) by 31 days.

(21) Appl. No.: 10/888,144

(22) Filed: Jul. 9, 2004

(51) Int. Cl.
*G06F 1/02* (2006.01)

(52) U.S. Cl. .................. 327/105; 327/107; 708/276

(58) Field of Classification Search ........ 327/105–107, 327/113–114, 141; 708/276
See application file for complete search history.

(56) References Cited

U.S. PATENT DOCUMENTS

| | | | | |
|---|---|---|---|---|
| 4,901,265 A | * | 2/1990 | Kerr et al. ................. | 708/276 |
| 4,975,699 A | * | 12/1990 | Frey ............................ | 341/118 |
| 5,521,533 A | | 5/1996 | Swanke ..................... | 327/107 |
| 5,554,987 A | * | 9/1996 | Ooga ......................... | 341/147 |
| 5,598,440 A | | 1/1997 | Domagala ................ | 375/329 |
| 5,821,816 A | * | 10/1998 | Patterson .................. | 331/1 A |
| 5,878,335 A | | 3/1999 | Kushner .................... | 455/260 |
| 6,094,101 A | | 7/2000 | Sander et al. ............. | 331/17 |
| 6,333,649 B1 | | 12/2001 | Dick et al. ................. | 327/105 |
| 6,522,176 B1 | | 2/2003 | Davis ......................... | 327/105 |
| 6,608,049 B1 | * | 8/2003 | Woltering et al. ........ | 514/186 |
| 6,670,854 B1 | * | 12/2003 | Takeda et al. ............. | 331/1 A |

OTHER PUBLICATIONS

Vankka, Jouko, "A Direct Digital Synthesizer with a Tunable Error Feedback Structure", IEEE Transactions on Communications, vol. 45, No. 4, Apr., 1997, pp. 416-420.
Jensen, Henrik, "A Low-Complexity Dynamic Element Matching DAC for Direct Digital Synthesis", IEEE Transactions on Circuits and Systems, vol. 45, No. 1, Jan., 1998, pp. 13-27.

* cited by examiner

*Primary Examiner*—Dinh T. Le
(74) *Attorney, Agent, or Firm*—Koppel, Jacobs, Patrick & Heybl

(57) ABSTRACT

Synthesizers are provided to generate synthesizer signals in response to primary digital signal representations that are created by a signal generator. In an important feature, the synthesizers further include a signal corrector that inserts correction digital signal representations to at least partially cancel a corresponding spurious component in the primary digital signal representation and thereby provide synthesizer signals with reduced spurious content.

20 Claims, 5 Drawing Sheets

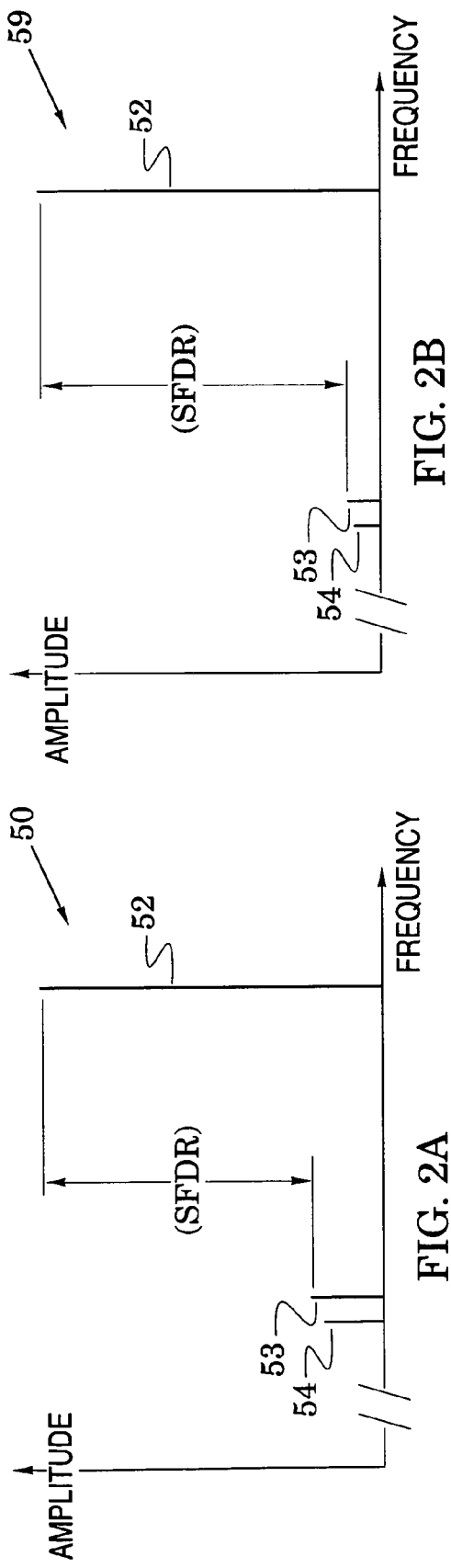

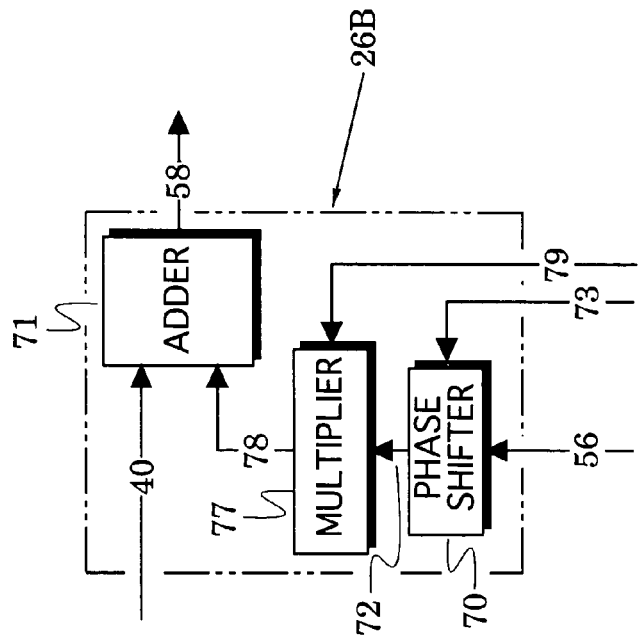
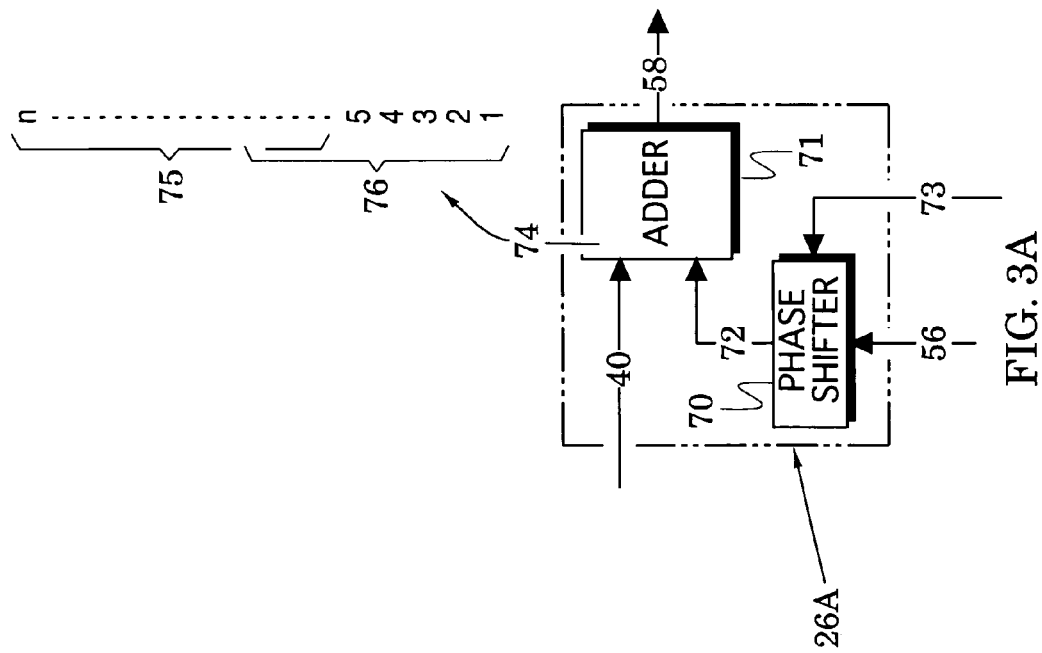

SYNTHESIZER STRUCTURES AND METHODS THAT REDUCE SPURIOUS SIGNALS

BACKGROUND OF THE INVENTION

1. Field of the Invention

The present invention relates generally to synthesizers and, more particularly, to direct digital synthesizers.

2. Description of the Related Art

A direct digital synthesizer generates analog signals that correspond to input tuning words and a synthesizer clock which also determines the synthesizer's Nyquist range. Although direct digital synthesizers provide a number of advantageous features (e.g., phase-continuous switching, high frequency resolution and fast switching time), they typically generate spurious signals which unduly limit their spurious free dynamic range. This limitation continues to be the most serious deficiency of direct digital synthesizers.

BRIEF SUMMARY OF THE INVENTION

The present invention is directed to synthesizers which generate synthesizer signals with reduced spurious content.

The novel features of the invention are set forth with particularity in the appended claims. The invention will be best understood from the following description when read in conjunction with the accompanying drawings.

BRIEF DESCRIPTION OF THE DRAWINGS

FIG. 2A is a graph that illustrates an output signal and associated spurious signals of a conventional synthesizer and FIG. 2B is a graph that illustrates an output signal and reduced spurious signals of the synthesizer of FIG. 1;

FIGS. 3A and 3B are block diagrams of processor embodiments in the synthesizer of FIG. 1;

DETAILED DESCRIPTION OF THE INVENTION

Figure 1:
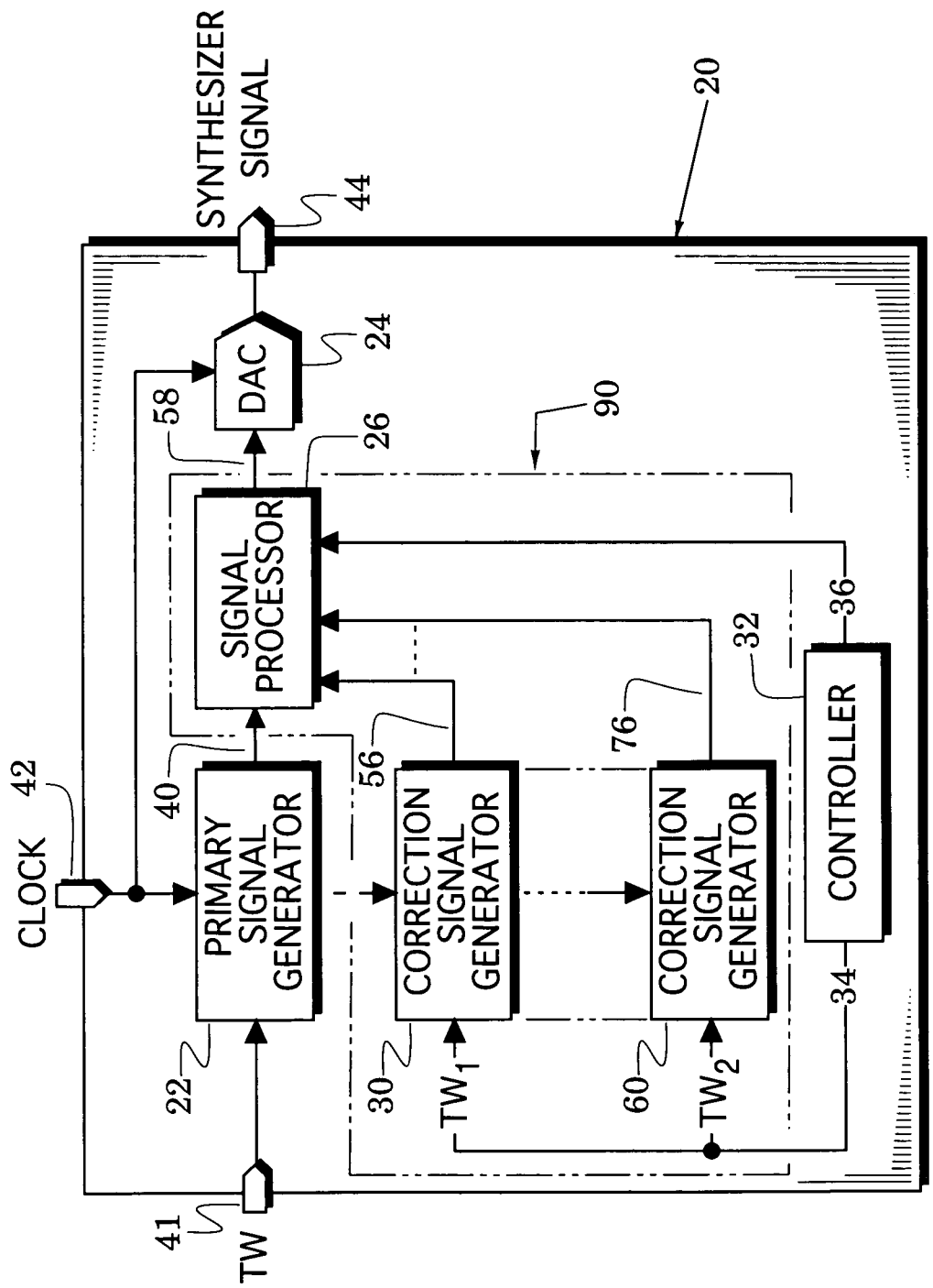
FIG. 1 is a block diagram of a synthesizer embodiment of the present invention.

FIG. 1 illustrates a synthesizer 20 which generates synthesizer signals in response to primary digital signal representations 40 that are provided by a signal generator 22. In an important feature of the invention, the synthesizer further includes a signal corrector 90 that inserts correction digital signal representations (e.g., 56 and 76) to at least partially cancel a corresponding spurious component in the primary digital signal representation and thereby provide synthesizer signals with reduced spurious content.

In particular, the synthesizer 20 includes a primary signal generator 22 and a digital-to-analog converter 24 that are coupled together by a signal processor 26. At least a first correction signal generator 30 is also coupled to the signal processor and a controller 32 provides tuning words 34 to the correction signal generator and commands 36 to the signal processor.

In operation of the synthesizer 20, the primary signal generator generates a primary digital signal representation 40 in response to a tuning word TW from an input port 41 and a clock signal from a clock port 42. When the primary digital signal representation is passed through the processor to the DAC 24, it is converted into a corresponding analog signal at an output port 44 as indicated by the primary signal 52 in the graph 50 of FIG. 2A.

Unfortunately, synthesizers generally also generate spurious signals because of imperfections in their signal generation and processing structures. As an example, inherent nonlinearities (e.g., nonlinear transfer function) in the DAC 24 can produce harmonics which combine with the clock signal to generate spurious signals that are the sums and differences of the harmonics and the clock signal.

In an specific example, let the clock signal be 400 MHz (so that the first Nyquist zone extends to 200 MHz) and the tuning word TW be selected to cause the primary signal 52 to be located at 159 MHz. The difference between the clock signal and the second harmonic of the primary signal 52 is 400−318=82 MHz which is shown as the first spurious signal 53 in FIG. 2A.

In addition, the difference between the third harmonic of the primary signal 52 and the clock signal is 477−400=77 MHz which is shown as the second spurious signal 54 in FIG. 2A. The spurious free dynamic range (SFDR) between the primary signal 52 and the highest of these spurious signals is shown in FIG. 2A and is typically on the order of 50 dB.

It is generally difficult to significantly reduce the first and second spurious signals 53 and 54. If, for example, a high-pass filter were inserted after the DAC 24 of FIG. 1 to reduce these spurious signals, it would unacceptably alter the amplitude of the primary signal 52 when its frequency was reduced by insertion of different tuning words into the input port 41.

In further operation of the synthesizer 20 of FIG. 1, however, the first correction signal generator 30 generates a first correction digital signal representation 56 in response to a first tuning word $TW_1$ from the controller 32. When the primary digital signal representation 56 is passed through the processor 26 to the DAC 24, it is converted into a corresponding analog signal at the output port 44. The controller 32 adjusts the first tuning word $TW_1$ so that the frequency of the first correction digital signal representation 56 is substantially the frequency of the first spurious signal 53 of FIG. 2A.

The signal processor 26 is configured to process the primary digital signal representation 40 and the correction digital signal representation 56 to provide a composite digital signal 58 that includes a phase-and-amplitude-modified version of the correction digital signal representation. Finally, the DAC 24 converts the composite digital signal to an analog synthesizer signal at the output port 44.

Because its frequency, phase and amplitude can be adjusted by commands from the controller 32, the first correction digital signal representation 56 can be configured to at least partially cancel a corresponding spurious component in the primary digital signal representation. In particular, it can be configured to at least partially cancel the first spurious signal 53 in FIG. 2A so that it is significantly reduced as shown in the graph 59 of FIG. 2B.

In a similar manner, a second correction signal generator 60 of FIG. 1 generates a second correction digital signal representation 76 in response to a second tuning word $TW_2$ from the controller 32. The controller adjusts this tuning word and the phase and amplitude of the second correction digital signal representation to at least partially cancel a corresponding spurious component in the primary digital signal representation. In particular, this action at least partially cancels the second spurious signal 54 in FIG. 2A so that it is also significantly reduced as shown in the graph 59 of FIG. 2B.

FIG. 3A shows that a first embodiment 26A of the processor 26 of FIG. 1 includes a phase shifter 70 and an adder 71. The phase shifter is coupled to process the first correction digital signal representation 56 and provide an adjusted first correction digital signal representation 72 that is then processed with the primary digital signal representation 40 in the adder 71 to provide the composite digital signal 58. In one embodiment, the phase shifter 70 is a digital adder that receives an adjustment word 73 (one of commands 36 in FIG. 1) from the controller (32 in FIG. 1) and adds it to (or subtracts it from) the first correction digital signal representation 56 to generate the adjusted correction digital signal representation 58.

Figure 4:
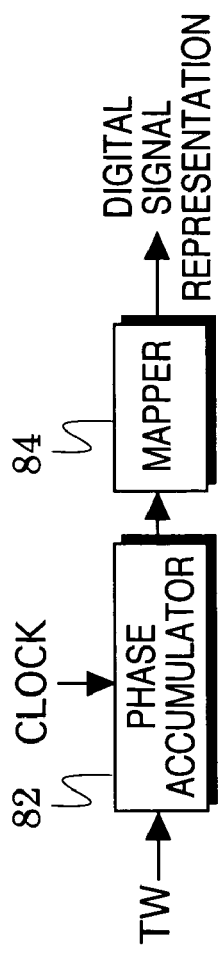
FIG. 4 is a block diagram of a signal generator embodiment in the synthesizer of FIG. 1.

The operation of the phase shifter 70 can be considered in association with an embodiment of the primary and correction signal generators 22, 30 and 60 of FIG. 1. In the embodiment of FIG. 4, a phase accumulator 82 (e.g., an adder and a register arranged in a loop with the register receiving the clock signal and the adder receiving the tuning word and the output of the register) drives an angle-to-amplitude mapper 84 (e.g., a lookup table and/or digitally-processed algorithm). The phase accumulator generates a digital ramp that repeats at an accumulator frequency that corresponds to the tuning word TW and the clock signal. The mapper 84 then maps the words of the digital ramp into a digital signal representation in which the signal is generally a sinusoid.

Returning attention to the phase shifter 70 of FIG. 3A, it is noted that it adds the adjustment word 73 to (or subtracts the adjustment word from) the first correction digital signal representation 56 to thereby adjust the phase of the representation. Thus, it subtracts or adds an adjustment word to the words of a digital signal representation that is generated, for example, by the structure of FIG. 4.

The adder 74 of FIG. 3A preferably has an n-bit input port indicated by an extension arrow 74 and a corresponding n-bit output port that mates to a similar n-bit input port in the DAC (24 in FIG. 1). The adder's input port can be arranged to shift bits of one of the primary digital signal representation 40 and the adjusted correction digital signal representation 72 relative to the other to thereby modify their relative amplitudes. For example, the primary digital representation may be received into upper bits 75 of the adder's input port and the adjusted correction digital signal representation may be received into lower bits 76.

In a specific example, the adder's input port may be 12 bits and the primary digital signal representation and the adjusted correction digital signal representation may each comprise 10 bits. In an exemplary arrangement, the primary digital signal representation may be received into the upper 10 bits of the adder's input port and the adjusted correction digital signal representation may be received into the lower 4 bits of the adder's input port (with the lower 6 bits of the adjusted correction digital signal representation thereby discarded).

The DAC 24 of FIG. 1 will thus convert the adjusted correction digital signal representation (72 in FIG. 3A) to an analog correction signal whose amplitude is substantially reduced relative to the primary signal 52 of FIG. 2A. Preferably, it is reduced so that it closely approximates the amplitude of the first spurious signal 53 of FIG. 2A.

If the tuning word into the correction signal generator 30 of FIG. 1 is also selected so that the frequency of the analog correction signal closely matches the frequency of the first spurious signal 53 and the adjustment word 73 of FIG. 3A is also selected so that the phase of the analog correction signal closely opposes the phase of the first spurious signal 53 (i.e., they are essentially 180 degrees out of phase), then the amplitude of the first spurious signal 53 of FIG. 2A will be significantly reduced as shown in FIG. 2B.

FIG. 3B shows another embodiment 26B of the processor 26 of FIG. 1 that is formed by inserting a multiplier 77 in series with the phase shifter (70 in FIG. 3A) to thereby further facilitate modification of the amplitude of the correction digital signal representation 56. The multiplier alters the adjusted first correction digital signal representation 72 into a different adjusted first correction digital signal representation 78.

In particular, the multiplier 77 can receive a command 79 (one of commands 36 in FIG. 1) from the controller (32 in FIG. 1) that causes it to multiply the adjusted first correction digital signal representation 72 by a fractional number (in an embodiment, the command may be the multiplying number) so that it, in effect, reduces the representation's amplitude. For example, the fractional number can be ½ which halves the amplitude to thereby (approximately) realize a 6 dB reduction. In one embodiment, the multiplier 77 is simply arranged to effect successive right shifts of the bits of the representation to successively realize 6 dB reductions in amplitude.

Figure 5:
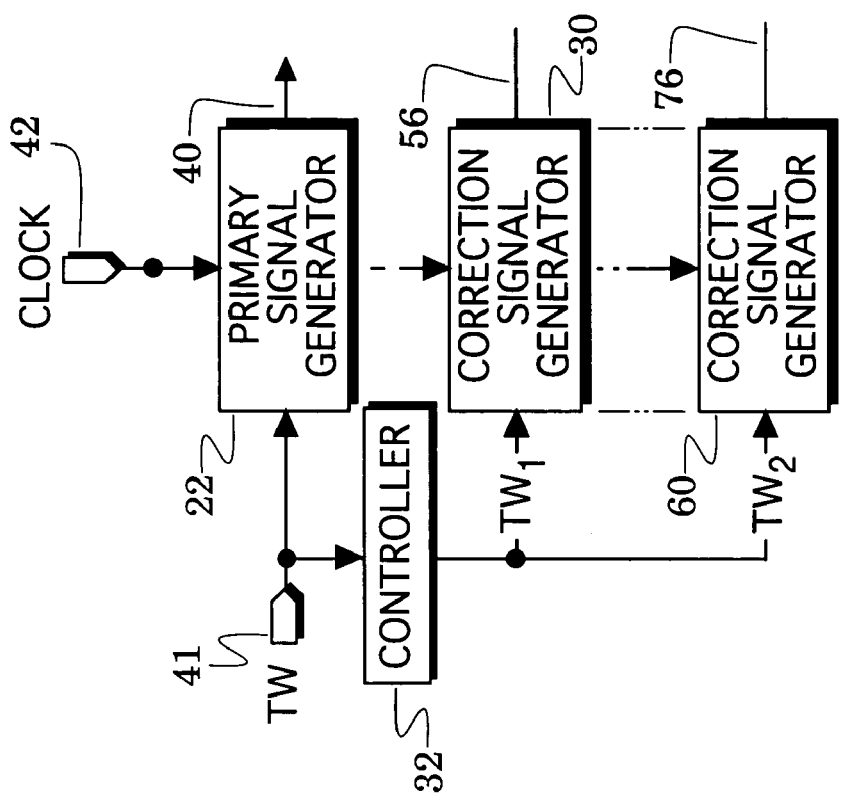
FIG. 5 is a block diagram that illustrates a controller embodiment in the synthesizer of FIG. 1.

FIG. 5 is a diagram that includes portions of the synthesizer 20 of FIG. 1. This diagram has been altered, however, to show that an embodiment of the controller 32 can be configured to directly generate the first and second tuning words $TW_1$ and $TW_2$ in response to the synthesizer's tuning word TW that enters the input port 41. For example, the controller can be configured to calculate, in response to the tuning word TW, the frequencies of spurious signals 53 and 54 of FIG. 2A that are the sums and differences of signal harmonics and the clock signal. The controller then automatically provides the corresponding first and second tuning words to the correction signal generators 30 and 60.

As described above, the first and second correction signal generators 30 and 60 of FIG. 1 generate first and second correction digital signal representations 56 and 76 that at least partially cancel corresponding spurious components in the synthesizer signal at the output port 44. As indicated with broken lines in FIG. 1, the synthesizer 20 can include additional correction signal generators that are directed to at least partially cancel additional corresponding spurious components in the synthesizer signal.

With a description of the embodiments of FIGS. 1–5 completed, it is now apparent that FIG. 1 illustrates a synthesizer 20 which has a primary signal generator 22, a signal corrector 90 and a DAC 24 wherein one embodiment of the signal corrector comprises at least one of the correction signal generators 30 and 60, and the signal processor 26. The primary signal generator 22 generates a primary digital signal representation with a primary frequency determined by a clock signal and a primary tuning word. The signal corrector 90 then inserts a correction digital signal representation to at least partially cancel a corresponding spurious component in the synthesizer signal at the output port 44 and thereby provide a composite digital signal 58. Finally, the digital-to-analog converter 24 converts the composite digital signal to an analog synthesizer signal.

Figure 6:
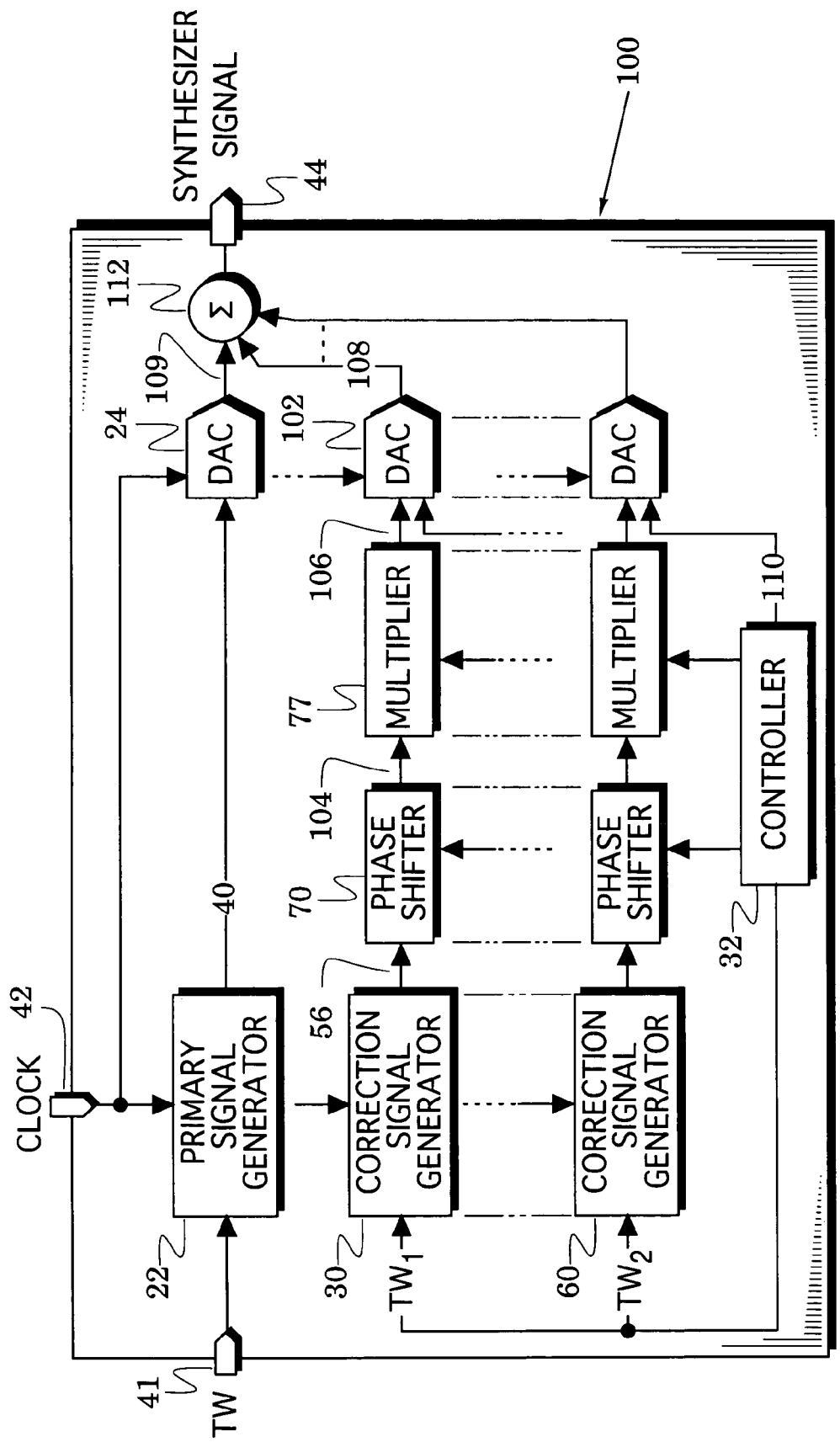
FIG. 6 is a block diagram of another synthesizer embodiment.

FIG. 6 illustrates another synthesizer embodiment 100 which includes elements of the synthesizer 20 of FIG. 1 with like elements indicated by like reference numbers. The synthesizer 100, however, removes the signal processor 26 from its location in FIG. 1 and, instead, inserts correction elements of the signal processor into correction paths of each of the correction signal generators 30 and 60. The synthesizer 100 then provides each of the correction paths with a respective DAC 102 (which is similar to the DAC 24). In particular, a phase shifter and a multiplier similar to the phase shifter 70 and multiplier 77 of FIG. 3B are inserted between each of the correction signal generators and their respective DACs 102.

In operation of the synthesizer 100, the DAC 24 converts the primary digital representation 40 into a synthesizer signal as shown in FIG. 2A. In further operation of the synthesizer 100, the first correction signal generator 30 generates a first correction digital signal representation 56 in response to a first tuning word $TW_1$ from the controller 32. In response to commands or adjustment words from the controller 32, a phase shifter 70 adjusts the phase of the first correction digital signal representation 56 to generate an adjusted correction digital signal representation 104. A multiplier 77 alters the adjusted first correction digital signal representation 104 into a different adjusted first correction digital signal representation 106 which has a reduced representation amplitude.

Finally, a DAC 102 converts the signal representation 106 into a correction analog synthesizer signal 108 whose frequency (in response to the tuning word $TW_1$) closely matches the frequency of the first spurious signal 53 of FIG. 2A. In addition, the phase of the correction analog synthesizer signal 108 closely opposes the phase of the first spurious signal 53 (in response to the phase shifter 70) and the amplitude of the correction analog synthesizer signal closely approximates the amplitude of the first spurious signal 53 (in response to the multiplier 77).

Accordingly, the amplitude of the first spurious signal 53 will be significantly reduced when the correction analog synthesizer signal 108 is summed with the primary analog synthesizer signal 109 (out of the primary DAC 24) to form the synthesizer signal at the synthesizer's output port 44. In a similar manner, the second correction signal generator 60 can be used with its respective phase shifter, multiplier and DAC to significantly reduce the amplitude of the second spurious signal 54 in FIG. 2A.

In another synthesizer embodiment, the DAC 102 includes a reference input and the amplitude of the DAC's analog output signal corresponds to the amplitude of a reference signal 110 inserted into this reference input. The reference signal can be provided by the controller 32 and scaled to appropriately reduce the amplitude of the correction analog synthesizer signal 108. Accordingly, the reference signal can be adjusted to supplement the amplitude reductions of the multiplier 77 or to replace the reductions of this multiplier (and thus remove the need for the multiplier).

Although the output signals of DACs (e.g., current-output DACs) can often be simply coupled together to form the synthesizer signal, the synthesizer 100 of FIG. 6 includes, to form a different synthesizer embodiment, a summer 112 which facilitates summation of the correction analog synthesizer signals, e.g., 108, and the primary analog synthesizer signal 109.

As the frequency of the primary signal generator 22 of FIG. 1 is altered by new tuning words, the frequency, phase and amplitude of output spurious signals will change. In response, the controller 32 must provide corresponding tuning words to the correction signal generators and corresponding phase and amplitude commands to portions of the signal processor 26 to continue to reduce the spurious signals. Although the synthesizer embodiments of FIGS. 1 and 5 include the controller 32, its control signals (e.g., tuning words and multiplier commands) can be supplied by various other sources (e.g., stored in a memory).

Other embodiments of the invention can be provided by appropriate structural and functional modifications. For example, FIGS. 3A and 3B show the first correction digital signal representation 56 processed to an adjusted first correction digital signal representation 72 which is summed with the digital signal representation 40 in the adder 71. Other correction digital signal representations (e.g., the second correction digital signal representation 76 of FIG. 1) can be similarly processed and summed into the same adder or, in a different embodiment, the correction digital signal representations can be successively summed with the digital signal representation 40 in a string of adders.

As another example, the phase shifter 70 of FIG. 3A can be relocated from the signal processor 26A to be positioned, instead, in its corresponding correction signal generator 30. In a third example, the mapper 84 of FIG. 4 may be configured to sufficiently modify (e.g., reduce) the amplitude of its corresponding digital signal representation so that a corresponding phase shifter (e.g, the phase shifter 70 of FIG. 3A) does not overrange the signal representation as it alters it. For a fourth example, embodiments of controllers of the invention (32 in FIGS. 1, 5 and 6) can be realized with arrays of digital gates, an appropriately-programmed digital processor or combinations thereof.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of synthesizing a signal, comprising the steps of:
   generating a primary digital signal representation with a primary frequency determined by a clock signal and a primary tuning word;
   generating a correction digital signal representation with a correction frequency determined by said clock signal and a correction tuning word;
   adjusting a phase and an amplitude of said correction digital signal representation to thereby provide an adjusted correction digital signal representation;
   converting said primary digital signal representation to a primary analog synthesizer signal;
   converting said adjusted correction digital signal representation to a correction analog synthesizer signal; and
   to at least partially cancel a spurious component in said primary analog synthesizer signal, summing said primary analog synthesizer signal and said correction analog synthesizer signal to provide an output analog synthesizer signal.

2. A method of synthesizing a signal, comprising the steps of:
   generating a primary digital signal representation with a primary frequency determined by a clock signal and a primary tuning word;
   into said primary digital signal representation, inserting a correction digital signal representation to at least partially cancel a corresponding spurious component in said primary digital signal representation and thereby provide a composite digital signal; and
   converting said composite digital signal to an analog synthesizer signal;
   wherein said inserting step includes the steps of:
   generating said correction digital signal representation with a correction frequency determined by said clock signal and a correction tuning word; and
   processing said primary digital signal representation and said correction digital signal representation to provide said composite digital signal with a phase-and-amplitude-modified version of said correction digital signal representation which at least partially cancels said corresponding spurious component.

3. The method of claim 2, wherein said processing step includes the steps of:
   adjusting a phase of said correction digital signal representation to provide an adjusted correction digital signal representation; and
   adding said primary digital signal representation and said adjusted correction digital signal representation to provide said composite digital signal.

4. The method of claim 3, wherein said processing step includes the step of shifting bits of one of said primary digital signal representation and said adjusted correction digital signal representation relative to the other to thereby modify a relationship between an amplitude of said primary digital signal representation and an amplitude of said adjusted correction digital signal representation.

5. The method of claim 3, further including the step of multiplying said correction digital signal representation by a factor that reduces its amplitude.

6. The method of claim 3, further including the step of shifting bits of said correction digital signal representation to thereby reduce an amplitude of said correction digital signal representation.

7. The method of claim 2, wherein each of said generating steps comprises the steps of:
   providing a digital ramp in response to said clock signal and a respective tuning word; and
   mapping said digital ramp to a digital signal representation.

8. A synthesizer, comprising:
   a primary signal generator that generates a primary digital signal representation with a primary frequency determined by a clock signal and a primary tuning word;
   a signal corrector that inserts, into said primary digital signal representation, a correction digital signal representation to at least partially cancel a corresponding spurious component in said primary digital signal representation and thereby provide a composite digital signal; and
   a digital-to-analog converter that converts said composite digital signal to an analog synthesizer signal;
   wherein said signal corrector includes:
   a correction signal generator that generates said correction digital signal representation with a correction frequency determined by said clock signal and a correction tuning word; and
   a signal processor that responds to said primary digital signal representation and said correction digital signal representation and provides a composite digital signal that includes a phase-and-amplitude-modified version of said correction digital signal representation which at least partially cancels said corresponding spurious component.

9. The synthesizer of claim 8, wherein said processor includes:
   a digital phase shifter that adjusts the phase of said correction digital signal representation to provide an adjusted correction digital signal representation; and
   a digital adder that provides said composite digital signal in response to said primary digital signal representation and said adjusted correction digital signal representation.

10. The synthesizer of claim 9, wherein said adder is arranged to shift bits of one of said primary digital signal representation and said adjusted correction digital signal representation relative to the other to thereby modify a relationship between an amplitude of said primary digital signal representation and an amplitude of said adjusted correction digital signal representation.

11. The synthesizer of claim 9, wherein said phase shifter is a digital adder.

12. The synthesizer of claim 9, wherein a multiplier is inserted in series with said phase shifter to modify an amplitude of said correction digital signal representation.

13. The synthesizer of claim 8, wherein each of said primary signal generator and said correction signal generator comprises:
   a phase accumulator that provides a digital ramp in response to said clock signal and a respective tuning word; and
   a mapper that maps said digital ramp to a digital signal representation.

14. The synthesizer of claim 8, further including a controller that provides said correction tuning word in response to said primary tuning word.

15. The synthesizer of claim 8, further including a controller that provides said primary tuning word and said correction tuning word and commands said processor to obtain said phase-and-amplitude-modified version.

16. A synthesizer, comprising:
- a primary signal generator that generates a primary digital signal representation with a primary frequency determined by a clock signal and a primary tuning word;
- a primary digital-to-analog converter that converts said primary digital signal representation to a primary analog synthesizer signal;
- a correction signal generator that generates a correction digital signal representation with a correction frequency determined by a clock signal and a correction tuning word;
- a digital phase shifter that adjusts the phase of said correction digital signal representation to provide an adjusted correction digital signal representation;
- a primary digital-to-analog converter that converts said primary correction digital signal representation to a primary analog synthesizer signal;
- a correction digital-to-analog converter that converts said adjusted correction digital signal representation to a correction analog synthesizer signal; and
- a summer that sums said primary analog synthesizer signal and said correction analog synthesizer signal to form a synthesizer signal in which said correction analog synthesizer signal at least partially cancels a corresponding spurious component in said primary digital signal representation.

17. The synthesizer of claim 16, wherein said phase shifter is a digital adder.

18. The synthesizer of claim 16, further including a multiplier inserted in series with said phase shifter to modify an amplitude of said correction digital signal representation.

19. The synthesizer of claim 16, wherein said correction digital-to-analog converter receives a reference signal scaled to reduce an amplitude of said correction analog synthesizer signal.

20. The synthesizer of claim 16, wherein each of said primary signal generator and said correction signal generator comprises:
- a phase accumulator that provides a digital ramp in response to said clock signal and a respective tuning word; and
- a mapper that maps said digital ramp to a digital signal representation.

* * * * *